United States Patent
Rajan et al.

(10) Patent No.: US 12,241,143 B2
(45) Date of Patent: Mar. 4, 2025

(54) CONGRUENTLY MELTING TITANIUM-ZIRCONIUM-NIOBIUM ALLOY

(71) Applicant: RAYTHEON COMPANY, Waltham, MA (US)

(72) Inventors: Sunder S. Rajan, Anaheim, CA (US); Robert Ko, Redondo Beach, CA (US); Michael Ushinsky, Irvine, CA (US)

(73) Assignee: RAYTHEON COMPANY, Waltham, MA (US)

( * ) Notice: Subject to any disclaimer, the term of this patent is extended or adjusted under 35 U.S.C. 154(b) by 875 days.

(21) Appl. No.: 16/265,085

(22) Filed: Feb. 1, 2019

(65) Prior Publication Data

US 2020/0248285 A1   Aug. 6, 2020

(51) Int. Cl.
  C22C 14/00   (2006.01)
  B33Y 70/00   (2020.01)

(52) U.S. Cl.
  CPC .............. C22C 14/00 (2013.01); B33Y 70/00 (2014.12)

(58) Field of Classification Search
  CPC ....... C22C 14/00; C22C 1/0458; B33Y 70/00; B33Y 10/00; Y02P 10/25; B22F 2998/10
  See application file for complete search history.

(56) References Cited

U.S. PATENT DOCUMENTS

| | | |
|---|---|---|
| 5,674,280 A | 10/1997 | Davidson et al. |
| 5,801,891 A | 9/1998 | Lloyd |
| 2013/0180627 A1 | 7/2013 | Miura et al. |
| 2014/0061420 A1 | 3/2014 | Kaufman et al. |
| 2017/0275742 A1 | 9/2017 | Ganor |
| 2018/0004070 A1 | 1/2018 | Po et al. |
| 2019/0105876 A1 | 4/2019 | Al-Aqeeli et al. |
| 2019/0111482 A1* | 4/2019 | Djemai ............. C22F 1/183 |
| 2023/0280564 A1 | 9/2023 | Rajan et al. |
| 2023/0405678 A1 | 12/2023 | Rajan et al. |

FOREIGN PATENT DOCUMENTS

| | | |
|---|---|---|
| CN | 109136600 A | 1/2019 |
| EP | 0601804 A1 | 6/1994 |
| EP | 1890183 A1 | 2/2008 |
| EP | 3112055 A1 | 1/2017 |
| EP | 3252278 A1 | 12/2017 |
| FR | 3047489 A1 | 8/2017 |
| WO | 2011139384 A1 | 11/2011 |
| WO | 2013112217 A2 | 8/2013 |
| WO | 2015038233 A1 | 3/2015 |

(Continued)

OTHER PUBLICATIONS

Schneider et al., "Study of the Non-Linear Stress-Strain Behavior in Ti—Nb—Zr Alloys", Jun. 27, 2005, Materials Research, vol. 8, No. 4, pp. 435-438 (Year: 2005).*

(Continued)

Primary Examiner — Adil A. Siddiqui
(74) Attorney, Agent, or Firm — CANTOR COLBURN LLP

(57) ABSTRACT

A compliant mount or mechanism structure includes a titanium-zirconium-niobium alloy including titanium, about 13.5 to about 14.5 wt. % zirconium, and about 18 to about 19 weight % (wt. %) niobium. The titanium-zirconium-niobium alloy has a congruent melting temperature of about 1750 to about 1800° C.

13 Claims, 8 Drawing Sheets

(56) References Cited

FOREIGN PATENT DOCUMENTS

| WO | WO-2017137671 A1 * | 8/2017 | ............ C22C 1/045 |
|---|---|---|---|
| WO | 2018126191 A1 | 7/2018 | |
| WO | 2020160117 A1 | 8/2020 | |

OTHER PUBLICATIONS

Chow et al., "Evaluation of Cardiovascular Stents as Antennas for Implantable Wireless Applications", IEEE Transactions on Microwave Theory and Techniques, Plenum, USA, vol. 57, No. 10, Oct. 1, 2009, pp. 2523-2532, XP011276668.

ISR/WO, Issued Apr. 14, 2020, RAY0410PCT.

Schneider et al., "Study of the non-linear stress-strain behavior in Ti—Nb—Zr alloys", Materials Research, vol. 8, No. 4, pp. 435-438, XP009152292, Oct. 1, 2005.

Bhuiyan et al., "Boron nitride nanotube reinforced titanium metal matrix composites with excellent high-temperature performance" Cambridge Core, vol. 32, Issue 19, 2017, pp. 3744-3752 (Abstract Only).

Bhuiyan et al., "Interfacial reactions between titanium and boron nitride nanotubes", ScienceDirect, Scripta Materialia, vol. 127, Jan. 15, 2017, pp. 108-112 (Abstract Only).

Bobbio et al., "Additive manufacturing of a functionally graded material from Ti—6Al—4V to Invar: Experimental characterization and thermodynamic calculations", Acta Materialia 127 (2017) 133-142.

Chen et al., "Additive manufacturing of metal functionally graded materials: A Review", Proceedings of the 29th Annual Solid Freedom Fabrication Symposium 2018.

Chen et al., "Optimization of lightweight structure and supporting bipod flexure for a space mirror", Applied Optics, vol. 55, No. 36, Dec. 20, 2016.

Chen et al., "Processing and properties of magnesium containing a dense uniform dispersion of nanoparticles" Nature 528, 539-543 (2015) (Abstract Only).

Chin, "Optical Mirror-Mount Design and Philosophy", Applied Optics, Jul. 1964, vol. 3, No. 7, pp. 895-901.

Chu et al., "Design of Bipod flexures for space mirror", Proceedings of SPIE, vol. 8196, 819620-1 through 819620-11.

Harrison et al., "Polyethylene/boron nitride composites for space radiation shielding", Journal of Applied Polymer Science, 2008, vol. 109 Issue 4 (Abstract Only).

Kihm et al., "Adjustable bipod flexures for mounting mirrors in a space telescope", Applied Optics vol. 51, No. 32, Nov. 10, 2012.

Reichardt, "Additive Manufacturing of Metal-based Functionally Graded Materials", UC Berkeley, PHD Thesis Nuclear Engineering 2017, p. 213.

Reichardt, "Additive Manufacturing of Metal-based Functionally Graded Materials", UC Berkeley, PHD Thesis Nuclear Engineering 2017, pp. 109-163.

Reichardt, "Additive Manufacturing of Metal-based Functionally Graded Materials", UC Berkeley, PHD Thesis Nuclear Engineering 2017, pp. 1-108.

Reichardt, "Additive Manufacturing of Metal-based Functionally Graded Materials", UC Berkeley, PHD Thesis Nuclear Engineering 2017, pp. 164-212.

Thibeault et al., "Radiation Shielding Materials Containing Hydrogen, Boron, and Nitrogen: Systematic Computational and Experimental Study—Phase I" NIAC Final Report, 2012.

Tian Tuo Machinery, "The first successful 3D printing of BNNT", https://frptitan.com/bnnt-titanium-composites/.

Wang et al., "Selective laser melting under the reactive atmosphere: A convenient and efficient approach to fabricate ultrahigh strength commerically pure titanium without sacrificing ductility", ScienceDirect, Materials Science and Engineering: A, vol. 762, Aug. 5, 2019, 138078 (Abstract Only).

Yan et al., "Additive manufacturing of functionally graded metallic materials using laser metal deposition", Elsevier, Additive Manufacturing 31 (2020) 100901.

ASTM International, F1713-08, "Standard Specification for Wrought Titanium-13Niobium-13Zirconium Alloy for Surgical Implant Applications (UNS R58130)1", Reapproved 2013, 5 pps.

Ezekiel G. Merriam, "Design of 3D-Printed Titanium Compliant Mechanisms," Proceedings of the 42nd Aerospace Mechanisms Symposium, NASA Goddard Space Flight Center, May 14-16, 2014, 6 pps.

Gen-El-Mec Associates, Inc., "Gen-El-Mec Specializes in Precision & Custom CNC Milling, Turning & Wire EDM Services", Custom Manufacturing & Inspection of Titanium Flexures—Connecticut, © 2014, 2 pages.

Hiroaki Matsumoto, et al., "Beta TiNbSn Alloys with Low Young's Modulus and High Strength", Materials Transactions, vol. 46, No. 5 (2005) pp. 1070 to 1078.

Jason J. Gorman, et al., "MEMS Nanopositioning Mechanisms: Design and Experimental Characterization", MEMS Alliance Symposium, Apr. 19, 2005, 16 pps.

Michael Gasik, et al., "Phase equilibria and thermal behaviour of biomedical Ti—Nb—Zr alloy", ResearchGate, 17th Plansee Seminar Jan. 2009, vol. 1 8 pps.

MIT OpenCourseWare (Massachusetts Institute of Technology), http://ocw.mit.edu/terms, 2.72 Elements of Mechanical Design Lecture 08: Flexures, Spring 2009, 42 pps.

Qing Liu, "α Type Ti—Nb—Zr alloys with ultra-low Young's modulus and high strength", Progress in Natural Science: Materials International 2013; 23 (6) pp. 562-565.

Qingkun Meng, et al., "A β-type TiNbZr alloy with low modulus and high strength for biomedicalapplications", Progress in Natural Science:Materials International 24 (2014), pp. 157-162.

Robert Fata, et al., "Flexure mounts for high performance astronomical lenses", Proc. of SPIE vol. 6269, 62695T, (2006), 12 pps.

Todd M. Mower, et al., "Mechanical behavior of additive manufactured, powder-bed laser-fused materials", Materials Science & Engineering A 651 (2016) pp. 198-213.

Tomomichi Ozaki, et al., "Beta Ti Alloys with Low Young's Modulus", Materials Transactions, vol. 45, No. 8 (2004) pp. 2776 to 2779.

Vukobratovich D, et al., "Flexure Mounts For High Resolution Optical Elements", Proc. of SPIE vol. 0959, Optomechanical and Electro-Optical Design of Industrial Systems, ed. R J Bieringer, K G Harding (Jan. 1988) Copyright SPIE., 19 pps.

Notification of Transmittal of the International Search Report and the Written Opinion of the International Searching Authority, or the Declaration mailed Jun. 23, 2021, 20 pages.

Notification of Transmittal of the International Search Report and the Written Opinion of the International Searching Authority, or the Declaration mailed Jul. 6, 2021, 16 pages.

A Zettl, "Electroactive, Radiation-shielding Boron Nitride Polymer Composites", University of California at Berkeley, AFOSR Low Density Materials Program Review, Dayton, Ohio Jun. 4, 2012, (https://community.apan.org/wg/afosr/m/low_density_materials/113496/download), 16 pages.

PCT Notification of Transmittal of the International Preliminary Report on Patentability of the International Application No. PCT/US2021/026373 mailed Feb. 9, 2023, 14 pages.

PCT Notification of Transmittal of the International Preliminary Report on Patentability of the International Application No. PCT/US2021/026376 mailed Feb. 9, 2023, 11 pages.

Rao et al. "Replication and bioactivation of Ti-based alloy scaffold macroscopically identical to cancellous bone from polymeric template with TiNbZr powders." Journal of the Mechanical Behavior of Biomedical Materials 88 (2018): 296-304.

\* cited by examiner

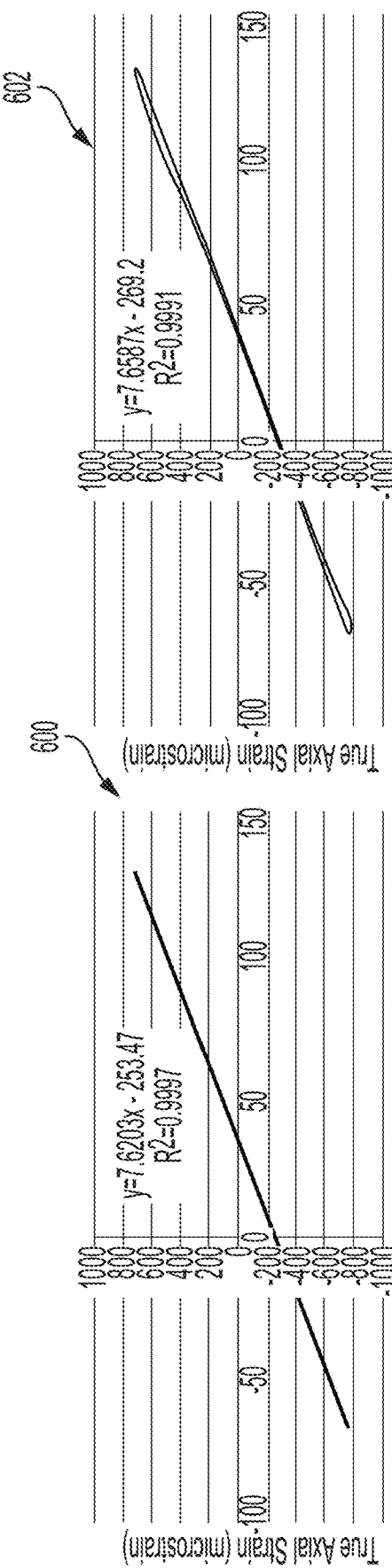
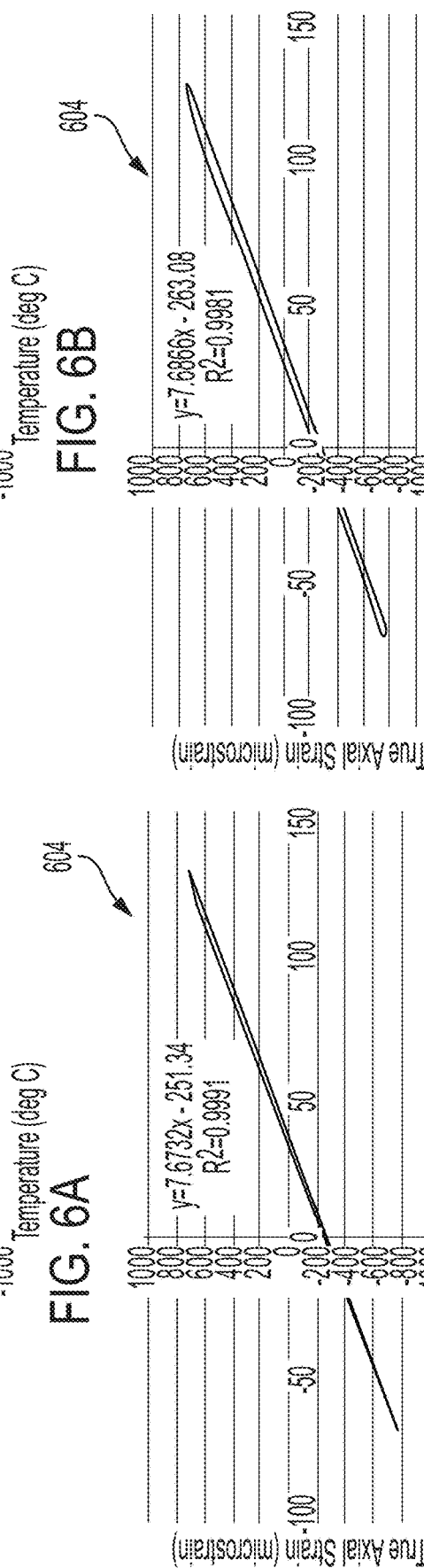
FIG. 6A
FIG. 6B
FIG. 6C
FIG. 6D

CONGRUENTLY MELTING TITANIUM-ZIRCONIUM-NIOBIUM ALLOY

BACKGROUND

The present disclosure relates to metallic alloys, and more specifically, to congruently melting titanium-zirconium-niobium alloys.

Due to their favorable properties, titanium (Ti) alloys are used in a variety of aerospace applications. For example, these materials are used for in structural airframes and engine components. Titanium alloys are also used in high resolution optical instruments in space exploration, precise motion control mechanical systems, flexural parts of micropositioners and optical mounts, and wire-type antennae, all of which are often designed to maintain the position of an optical element throughout its assigned life time.

Generally, flexures mentioned in the foregoing applications are elastic elements that provide precisely controlled motion under static and dynamic mechanical loads and thermal stress effects, including transient and steady state temperature regimes. Flexures are passive mechanical structures that isolate a light transmitting or reflecting glass or crystal optical unit from the mechanical and thermal effects of the adjoining metal structural support.

Flexures generally must satisfy the following criteria. Flexures should exert low stress on the optic or optoelectronic components and have sufficient stiffness to maintain the alignment of optics. Flexures should maintain the specified tolerance during operation, as well as under variable temperatures. Flexures should maintain the position of optical element throughout its assigned lifetime, and all dimensional and mass parameters should be minimized.

SUMMARY

According to one or more embodiments of the present invention, a compliant mount or mechanism structure includes a titanium-zirconium-niobium alloy including titanium, about 13.5 to about 14.5 wt. % zirconium, and about 18 to about 19 weight % (wt. %) niobium. The titanium-zirconium-niobium alloy has a congruent melting temperature of about 1750 to about 1800° C.

According to other embodiments of the present invention, a powder composition includes a titanium-zirconium-niobium alloy including titanium, about 13.5 to about 14.5 wt. % zirconium, and about 18 to about 19 weight % (wt. %) niobium. The titanium-zirconium-niobium alloy has a congruent melting temperature of about 1750 to about 1800° C.

Yet, according to some embodiments of the present invention, a method of making an article includes using a titanium-zirconium-niobium alloy to make the article by an additive manufacturing process. The titanium-zirconium-niobium alloy has a congruent melting temperature of about 1750 to about 1800° C.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts:

FIG. 6A depicts a graph illustrating the coefficient of thermal expansion of a titanium-zirconium-niobium alloy according to embodiments of the present invention;

FIG. 6B depicts a graph illustrating the coefficient of thermal expansion of a titanium-zirconium-niobium alloy according to embodiments of the present invention;

FIG. 6C depicts a graph illustrating the coefficient of thermal expansion of a titanium-zirconium-niobium alloy according to embodiments of the present invention; and FIG. 6D depicts a graph illustrating the coefficient of thermal expansion of a titanium-zirconium-niobium alloy according to embodiments of the present invention.

DETAILED DESCRIPTION

Figure 1A:
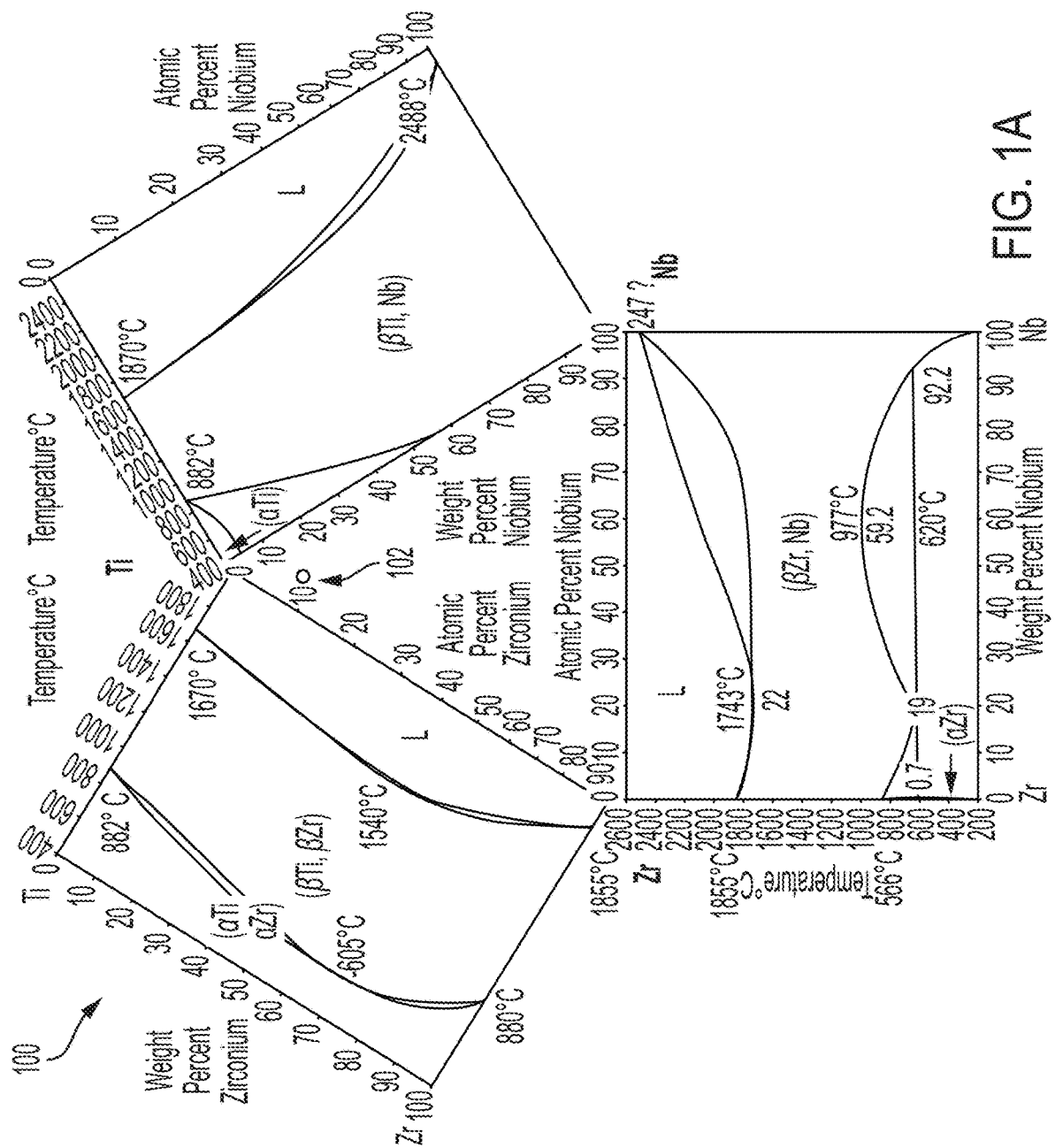
FIG. 1A depicts a planar view of a ternary phase diagram illustrating congruent melting zones of a titanium-zirconium-niobium alloy according to embodiments of the present invention.

For the sake of brevity, conventional techniques related to metallurgical processing, melting, and casting may or may not be described in detail herein. Moreover, the various tasks and process steps described herein can be incorporated into a more comprehensive procedure or process having additional steps or functionality not described in detail herein. In particular, various steps in the manufacture of metal alloys are well known and so, in the interest of brevity, many conventional steps will only be mentioned briefly herein or will be omitted entirely without providing the well-known process details.

The phrase "compliant" when referring to a mount or mechanism structure refers to a flexure or antenna, such as a wire antenna or an optical mounting flexure.

The phrase "flexure" and variations thereof refers to a flexible element (or combination of elements) engineered to be compliant in specific degrees of freedom. Non-limiting examples of flexures include opto-mechanical mounts, optoelectronic mounts, and other compliant structures of mechanisms. Flexures are all characterized by nonlinear stress-displacement response.

Turning now to an overview of technologies that are more specifically relevant to aspects of the invention, titanium alloys play key roles in space and tactical design applications due to their favorable properties, such as high strength and ductility, in combination with reduced elastic modulus. However, challenges of using titanium alloys in flexures, optical mounts, and other compliant structures and mechanisms are due to their lack of sufficient flexibility and excessive actuation effort needed due to energy storage in the deflection mechanism. In some cases, fabrication of advanced compliant mounts and mechanisms with titanium alloys is limited by conventional post-processing, which includes rolling, extrusion, and other processes associated with large plastic deformations, due to such processes potentially affecting the material micro-structure.

Using titanium alloys in compliant mounts or mechanism structures such as flexures is also challenging because database information on the phase equilibria and thermochemistry of desired ternary titanium alloys, e.g., titanium-zirconium-niobium (Ti—Zr—Nb), is lacking. Such information is needed to model the alloy in various flexures, as well as its metallurgical processing, particularly, its solidification homogenization, transient phase, and congruent melting specifics. The data is also needed to predict intermetallic phase formation and stability during industrial processing for the particular flexure. Accordingly, accurate experimental and thermodynamic assessment of various titanium alloys is needed to determine which ones are best suited for flexure applications.

Turning now to an overview of the aspects of the invention, one or more embodiments of the invention address the above-described shortcomings of the prior art by providing a titanium-zirconium-niobium (Ti—Zr—Nb) alloy, in particular a titanium alloy that includes about 13.5 to about 14.5 wt. % zirconium, about 18 to about 19 weight % (wt. %) niobium, and optionally other elements, that possesses ideally suited for biomedical applications, flexures, and other antenna applications. The titanium-zirconium-niobium alloys have a low coefficient of thermal expansion (CTE) that is coupled with a low modulus and high ductility. The titanium-zirconium-niobium alloys exhibit an unexpected increase in thermal conductivity with increasing temperatures, as well as a non-linearity in stress-strain behavior that are consistent with the behavior of flexures and other compliant structures that are subject to non-linear behavior. The titanium-zirconium-niobium alloys possess minimum congruent melting at temperatures of about 1750 to 1800° C., which results in increased ductility over time, and an expanded elongation break up to 30%. Unique miscibility of the ternary phase achieves a solid solution strengthening and lower modulus, as well as less susceptibility to embrittlement due to absence of an omega phase and related intermetallic inclusions.

The above-described aspects of the invention address the shortcomings of the prior art by providing a titanium-zirconium-niobium alloy that exhibits a low modulus over a broad temperature range (e.g., about 40° C. to about 120° C.), a consistent super-elastic behavior, and is not susceptible to embrittlement. The alloy retains composition consistency from the liquid to solid phases and subsequent processing, which is invaluable in a variety of applications because property values and performance will therefore be predictable.

Turning now to a more detailed description of aspects of the present invention, titanium-zirconium-niobium alloys are described herein. The titanium-zirconium-niobium alloys include about 13.5 to about 14.5 wt. % zirconium, about 18 to about 19 weight % (wt. %) niobium, and optionally other elements, with the balance being titanium. According to some embodiments of the present invention, the titanium-zirconium-niobium alloy includes 60 to about 72 wt. % titanium. According to other embodiments of the present invention, the titanium-zirconium-niobium alloy includes 66.5 to about 68.5 wt. % titanium.

According to one or more embodiments of the present invention, other elements are included in the titanium-zirconium-niobium alloy, which can be but are not limited to, iron (Fe), oxygen (O), carbon (C), nitrogen (N), hydrogen (H), or any combination thereof. However, the titanium-zirconium-niobium alloys can include other elements not mentioned in the foregoing elements, and the invention is not to be construed as being limited to these elements. The amounts of the other elements in the titanium-zirconium-niobium alloy are significantly less than the zirconium and niobium present, with the titanium making up a majority of the alloy. According to some embodiments of the present invention, the amount of each of the other elements is less than 1 wt. %, less than 0.5 wt. %, less than 0.2 wt. %, less than 0.1 wt. %, less than 0.05 wt. %, less than 0.02 wt. %, or less than 0.01 wt. %. Yet, the amounts of each of the other elements can vary substantially depending on the melting practices employed and the product being formed.

To form the titanium-zirconium-niobium alloy, various methods of melting, casting, and metal working can be used. The alloy can be manufactured by combining, melting and casting the titanium, zirconium, niobium, and optionally other elements, using a variety of melting and metal working practices, including but not limited to, vacuum induction melting, vacuum arc re-melting, hot forging, isothermal forging, rolling into billet shapes or slabs and, eventually, forming bar or sheet/plate products. The material can also be drawn into wire products for applications including, but not limited to, antenna wire, actuators, etc.

The methods used to form the alloys can alter the final chemical composition of the alloys. Methods of melting, e.g., air melting and vacuum induction melting, and using alloy powders made from atomization using air or oxidizing media can increase the oxygen level to as much as 0.3%, for example.

Prior to designing a metallurgical cycle, the phase diagram must be evaluated for an alloy, including the congruent melting zone. With a limited experimental data on properties of different constituents and phases, a spline approximation can be used, and 3D printing can define all metallurgical states using low-temperature polymers for modeling. The congruent melting is defined by a selected and separate color, such that the most applicable metallurgical process for congruent melting can be selected from that plastic model; it can have different approximations provided that all end within the congruent zone to reflect a single phase formation. Dimensional parameters of the congruent zone can be limited in sizes so that the incremental variations in practically achieved formulations still lie within the congruent zone defined by the phase diagram.

The titanium-zirconium-niobium alloys are also associated with alpha-beta micro-structural formation, excluding omega phase formation and the related intermetallic inclusions. Furthermore, the formation of any grain boundary precipitate within the beta phase is eliminated by virtue of the structural homogeneity of the phases and formation of solid solutions during all post-processes associated with high temperatures and even quenching. In the case of ternary and tetranary alloys, congruent melting can be achieved by the eutectic melting between two binary phases. Congruent melting zone determinations include construction of the ternary phase diagram by examination of the binary systems involved, i.e., a systematic study of Ti—Zr, Ti—Nb, and Nb—Zr systems. 3D printing technology is very helpful in the synthesis of the ternary system.

Figure 1B:
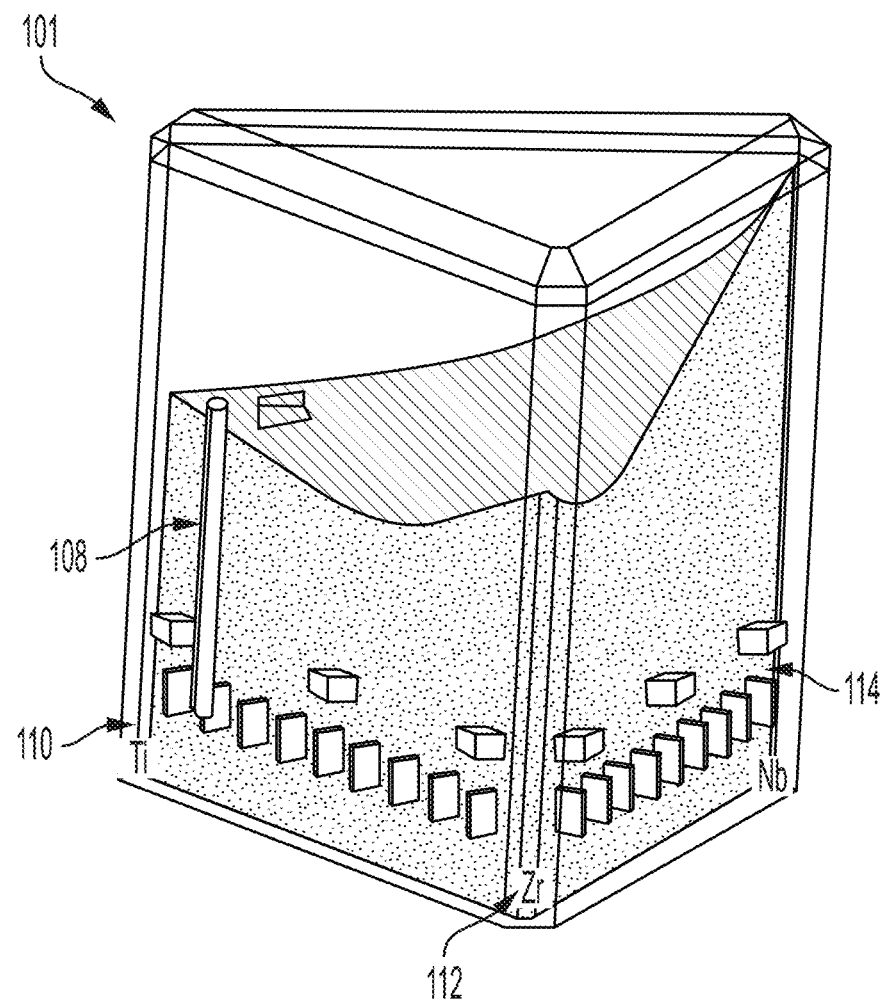
FIG. 1B depicts a three-dimensional (3D) view of a ternary phase diagram of illustrating congruent melting zones of a titanium-zirconium-niobium alloy according to embodiments of the present invention.

FIG. 1A depicts a planar view of a ternary phase diagram, and FIG. 1B depicts a 3D view of a ternary phase diagram, each illustrating congruent melting zones of a titanium-zirconium-niobium alloy according to embodiments of the present invention. In FIG. 1A, the alloy region is shown as a dot 102. In FIG. 1B, the alloy region is shown as a vertical column 108. The vertical edges 110, 112, 114 in the corners of FIG. 1B represent 100% each of Ti, Zr, and Nb, respectively. The ternary phase diagram of FIG. 1A is a two dimensional spread out view of the prismatic ternary diagram, which is analyzed using the synthesis of the ternary diagram by superposing the corresponding binary diagrams. Temperature measurements began at 1500° C. and extended through the melting range to precisely define the congruent melting temperature. By interpolation from the binary system diagrams, the unique phase boundaries become evident. A detailed understanding of phase diagrams and their synthesis are needed to establish the phase boundaries and the temperatures associated with them. 3D plastic model can be used for confirmation. The congruent melting conditions are shown at point 102, where niobium is about 18 to about 19 wt. %, zirconium is about 13.5 to about 14.5 wt. %, and titanium makes up the balance in wt. % of the alloy.

According to one or more embodiments of the present invention, the congruent melting temperature of the titanium-zirconium-niobium alloy is about 1950 to about 2000° C. According to other embodiments, the congruent melting temperature of the titanium-zirconium-niobium alloy is about 1850 to about 2000° C. The congruent melting temperature is less than each of titanium, zirconium, and niobium.

The titanium-zirconium-niobium alloys have a low modulus of elasticity, which is measured according to standard tensile test method ASTM E8/E8M-13a. Strain deformation due to exerted tensile load was monitored and recorded using a Class B2 rated extensometer. According to one or more embodiments of the present invention, the modulus of elasticity is about 8 to about 11 Megapounds per square inch (Msi) according to one or more embodiments of the present invention. According to other embodiments of the present invention, the titanium-zirconium-niobium alloys have a modulus of elasticity of about 8 to about 12 Msi. The low modulus is maintained over a temperature range of about −40° C. to about +125° C.

Aging the alloy following solution processing treatment at various temperatures further lowers the elastic modulus of the alloys and increases the yield strength without causing any undesirable side effects, such as omega phase formation or embrittlement. These properties are favorable for many applications, for example, antenna applications. While many materials used for antenna applications are transformation dependent, which means that the austenite start and finish ($A_s$ and $A_f$) temperatures must be controlled to achieve the super elasticity in the desired operating range, the titanium-zirconium-niobium alloys described herein exhibit consistent super elastic behavior that is transformation and temperature independent. Antenna wires, and other compliant flexural structures, can be stored and used at any temperature, without concern for how the transformation behavior will affect the performance of the antenna or structure.

The titanium-zirconium-niobium alloys also have high tensile strength and ductility, in combination with the low elastic modulus. Low temperature aging over time further enhances the strength and lowers the modulus of elasticity. Ultimate strength is measured according to procedures outlined in ASTM E8/E8M-13a and is the maximum stress the alloy can withstand. According to one or more embodiments of the present invention, the ultimate strength of the alloy is about 102 to about 125.5 Ksi. Yield strength is measured according to procedures outlines in ASTM E8/E8M-13a and is the stress that will cause a permanent deformation of 0.2% of the original dimension of the alloy. According to one or more embodiments of the present invention, the yield strength of the alloy is about 60 to about 120 Kilopound per square inch (Ksi). According to other embodiments of the present invention, the yield strength of the alloy is about 60 to about 115 Ksi.

The titanium-zirconium-niobium alloys also have an expanded elongation at break, which is up to 30% according to one or more embodiments of the present invention. The high elongation break demonstrates the high ductility of the alloys. The elongation at break, also referred to as strain-to-failure, is measured in accordance with ASTM E8/E8M-13a, paragraph 7.11.3.3. The elongation break is determined by measuring a scribed distance of 1.0 inch within the gauge area prior to and after testing. The measurement is reported as an engineering strain, albeit high elongation at failure. The elongation break measures a ratio between increased length and initial length after breakage of the alloy at room temperature. According to other embodiments of the present invention, the elongation at break is about 20% to about 30%. Like the elastic modulus, aging over time enhances the ductility, as measured by the elongation break, which is highly desirable.

The titanium-zirconium-niobium alloys demonstrate non-linear stress-strain behavior, which is described by the Ramberg-Osgood equation. The stress-strain curve is generated in accordance with the procedures outlined in ASTM E8/E8M-13a by using an extensometer. The Ramberg-Osgood equation approximates the non-linear behavior of materials in which the stress-strain curves cannot be represented by a linear function. The Ramberg-Osgood general equation is $\sigma = \kappa \varepsilon^n$, where $\sigma$ is the true stress of the alloy, $\varepsilon$ is the true strain of the alloy, $\kappa$ is a material constant of the alloy, and n is the strain hardening index of the alloy. The degree of non-linearity in the stress-strain behavior is quantified by the parameter n.

The non-linearity in stress-strain behavior makes the alloys suitable for a variety of compliant structures. In addition to the small magnitude physical non-linearity of stress-strain behavior, flexible structural members used in different precise flexures, flexural parts of micro-positioners, optical mounts, and antennae exhibit large deformations and/or large strains. The strain-displacement relations in these flexures become non-linear, which is primarily due to the large operational displacements. Such geometric non-linearity therefore is primarily associated with the mechanical systems, for example, including thin-walled shells, plates, and bars that undergo large deformations or deflections. In these types of structures, large deformations can result in non-linear strain and curvature displacement relationships. Thus, most of the precise flexures, flexural parts of micro-positioners, optical mounts, and antennae fabricated from titanium-zirconium-niobium alloys demonstrate the general type of non-linearity, as well as geometric non-linearity with non-linear displacement-strain structural behavior and stress-strain material non-linearity. The described alloys are non-linear materials from the very beginning of the loading process, which is an essential type of mechanical behavior fully applicable to design of the micro-optic and opto-electronic assemblies.

The titanium-zirconium-niobium alloys have a low coefficient of thermal expansion, which when coupled with low modulus and high ductility, makes these materials suitable for biomedical, flexure and other antenna applications cited herein. The coefficient of thermal expansion describes the fractional change in size per degree change in temperature at a constant pressure. The coefficient of thermal expansion is measured by testing two specimens. Each specimen is bonded with a uni-axial strain gauge along the longitudinal axis. The same type of strain gauge is also bonded to a reference near-zero expansion material, such as titanium silicate glass. The specimens and the reference material are put into a thermal cycling chamber and subjected to two (2) thermal cycles between −65° C. and +128° C. A personal computer based data acquisition system is used to monitor and record strain and temperature from the specimens and reference. The coefficient of thermal expansion is determined from the slope of the resulting strain versus temperature chart.

The titanium-zirconium-niobium alloys provide homogeneous chemistry, easy processing, and yield, which are desirable attributes of a flexible alloy with high ductility. Due to these properties, the alloys are not intended for high strength structural applications. Instead, the alloys are used in applications such as precise flexures, flexural parts of micro-positioners and optical mounts, antennae, and other compliant structures, where solution annealed strength in combination with high ductility and low modulus are valuable.

Figure 2:
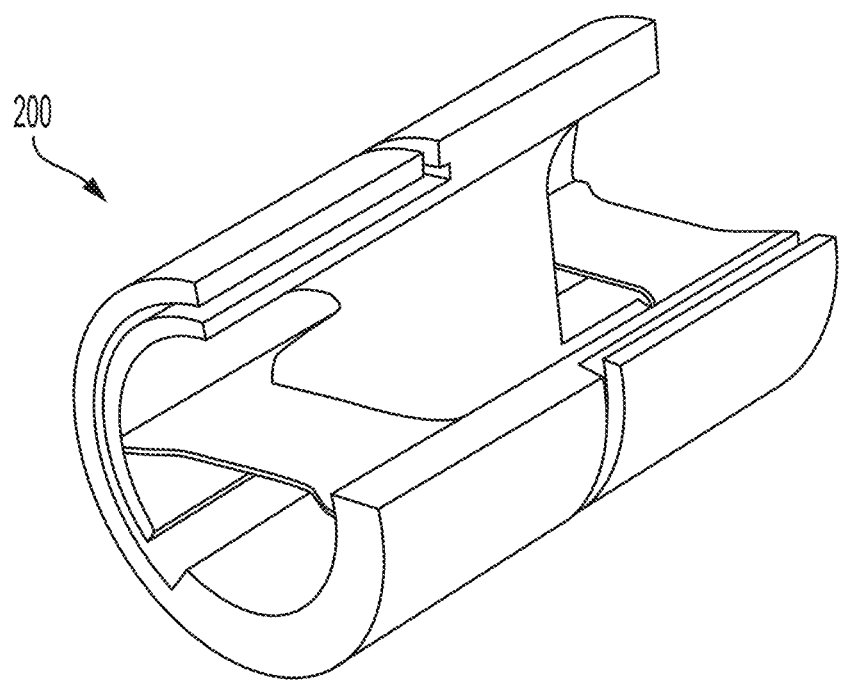
FIG. 2 depicts flexure that includes a titanium-zirconium-niobium alloy according to embodiments of the present invention.

FIG. 2 depicts flexure 200 that includes a titanium-zirconium-niobium alloy according to embodiments of the present invention. The flexure of FIG. 2 is a commercially available structure that can benefit from the titanium-zirconium-niobium alloy described herein. Other non-limiting examples of flexures that the inventive alloy can be used include those used in gimbals, blade flexure concepts, and bipods.

According to one or more embodiments of the present invention, the flexural articles incorporating the alloys include a rolled sheet metal, extruded tubing, or other pre-fabricated subcomponents. As such, post-processing steps associated with large plastic deformations, hardening, and the like, that affect the phases and micro-structure of the preforms can also provide extra stabilization. However, the flexures for which the alloys can be used are not limited to these types of structures.

According to some embodiments of the present invention, the alloy is used in an optical mount that is designed for all basic and extremely high stability requirements.

Figure 3A:
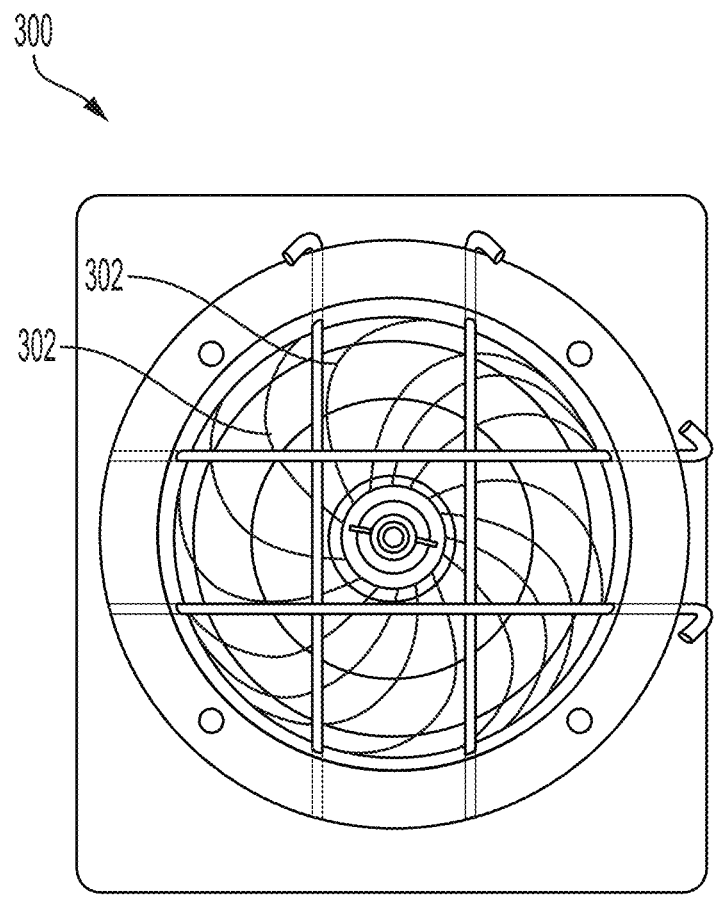
FIG. 3A depicts an antenna (stowed condition) that includes a titanium-zirconium-niobium alloy according to embodiments of the present invention.
Figure 3B:
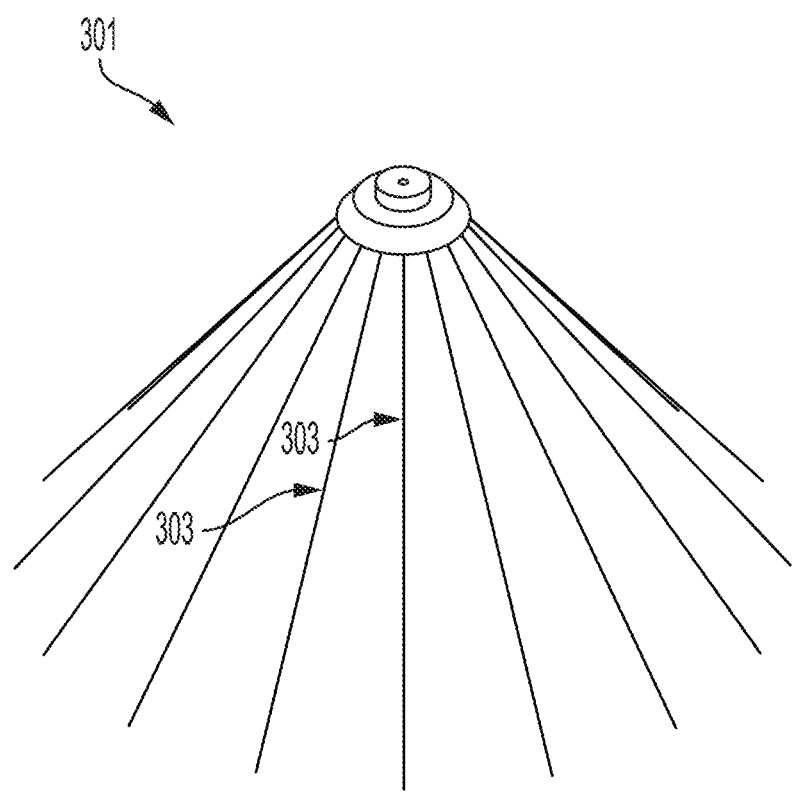
FIG. 3B depicts an antenna (deployed condition) that includes a titanium-zirconium-niobium alloy according to embodiments of the present invention.

Yet, according to other embodiments of the present invention, the alloy is used in an antenna. FIGS. 3A and 3B each depict structures with an antenna that includes a titanium-zirconium-niobium alloy according to embodiments of the present invention. FIG. 3A shows a structure 300 with an antenna 302 in the typical stowed condition. FIG. 3B shows a structure 301 with an antenna 303 in the typical deployed condition.

Optionally, according to embodiments of the present invention, the antenna includes dielectric coating layers for surface waves that influence the radiation pattern of the antenna. The relationship between the titanium alloy substrates, dielectric properties of the coatings, and the electrical path of the outgoing electric field define radiation efficiencies of the antenna and depend on the length of the surface waves.

According to other embodiments of the present invention, the alloys are used in additive manufacturing (AM). The titanium-zirconium-niobium alloy can be used to make a 3D article by an additive manufacturing process. A powder composition including the titanium-zirconium-niobium alloy is formed. The uniform chemistry of the solidified alloy is possible without segregation and while maintaining a low effective elastic modulus. Formation of a solid composition of niobium, zirconium, and titanium reduces reactivity of the alloying elements and results in superior oxidation resistance. Such properties are highly desirable in additive manufacturing processes, such as laser powder bed melting, electron beam melting, or arc melting of powder beds.

Still yet, according to other embodiments of the present invention, the alloys are used in cold spray applications. The alloy is cold sprayed alone or in a mixture with other elements, such as carbon or boron nitride nanotubes or glass bubbles. The cleanliness and homogeneity of the alloy is valuable in such applications. The alloys used in cold spray applications can be transition composite materials with gradually increasing conductivity or decreasing thermal expansion, both of which are suitable for optical and sensor type structural applications.

According to one or more embodiments of the present invention, the alloys are used in aircraft structures. The unique combination of high ductility and low modulus of the alloys would lead to excellent fatigue performance. Such superior fatigue performance in combination with high ductility and resultant high fracture toughness would guard against any catastrophic failures.

According to other embodiments of the present invention, the alloys are used in biomedical applications, for example, as a biomedical device or part of a biomedical device. The bio-inertness (i.e., excellent corrosion resistance-passivation, and minimum sensitization and toxic effects with body fluids resulting from either contact or any leaching of ingredients) of the alloy is highly desirable for biomedical applications. A strong bond at the interface of biomedical device/bone interface facilitates desired stress transfer, and for this reason, many surface treatments are used. The inventive alloys described herein lends itself to such surface treatments, which thereby minimizes stress at device joints. Additionally, the inventive alloys are highly biocompatible.

EXAMPLES

Titanium-zirconium-niobium alloy compositions were prepared and evaluated in accordance with embodiments of the present invention, as detailed in the Examples below.

Example 1

Tables 1 and 2 below show the composition of Alloys A and B, respectively, which illustrate non-limiting examples.

TABLE 1

Alloy A composition

| Element | Amount (wt. %) |
|---|---|
| Nb | 18.0 |
| Zr | 14.3 |
| Fe | 0.02 |
| O | 0.11 |
| C | 0.02 |
| N | 0.01 |
| H | 0.0012 |
| Others | <0.02 |
| Ti | Balance |

TABLE 2

| Alloy B composition | |
|---|---|
| Element | Amount (wt. %) |
| Nb | 18.6 |
| Zr | 14.1 |
| Fe | 0.03 |
| O | 0.10 |
| C | 0.02 |
| N | 0.01 |
| H | 0.0019 |
| Others | <0.02 |
| Ti | Balance |

Example 2

Elasticity and strength were measured to determine the elongation break. The test rate was 0.05 inch/minute. After 4% strain, the test rate was 0.15 inch/minute. Alloys C-F, as shown in Table 3, were solution treated at the indicated temperature and then water quenched. Alloy G was "hot forged" and cold finished. All alloys were tested in the- "solution treated" as well as "solution treated and aged" condition.

Strain-to-failure was determined by measuring a scribed distance of 1.0 inch within the gauge area prior to and after testing. The measurement was reported as an engineering strain, albeit high elongation at failure.

Table 3 shows the resulting tensile properties of the alloys. Aging enhances the alloy ductility, while slightly lowering the elastic modulus, both of which are highly desirable conditions. There was no evidence of embrittlement as experienced typically in beta titanium alloys.

TABLE 3

| Tensile Properties (Post-Thermal Age) | | | | | |
|---|---|---|---|---|---|
| Alloy | Solution Treatment Temperature (° C.) | Ultimate Strength (Ksi) | Modulus (Msi) | At 0.2% Offset (Ksi) | Strain-to-Failure (%) |
| C | 600 | 100.2 | 10.48 | 60.6 | 29.2 |
| D | 700 | 99.7 | 10.91 | 59.1 | 27.5 |
| E | 800 | 98.2 | 10.82 | 57.0 | 26.9 |
| F | 900 | 105.2 | 11.97 | 69.3 | 20.3 |
| G | — | 103.2 | 11.36 | 58.9 | 27.9 |

Example 3

The super-elasticity of an annealed titanium-zirconium-niobium alloy wire was measured at −40° C. The wire was wrapped around a 1.8 inch diameter mandrel at least four full turns at −37° C. Testing was performed in a vertical freezer operating at −40° C. to −44° C. The wire retained its super-elasticity after the mandrel wire wind test, which indicated that the material retained the same behavior regardless of the ambient temperature. These measurements demonstrated the non-dependence of the super elastic behavior on phase transformation.

Example 4

Figure 4B:
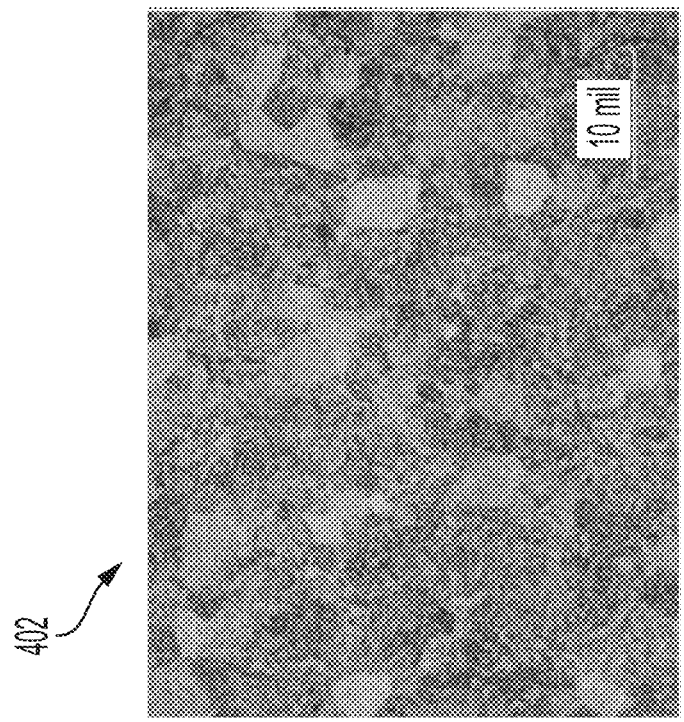
FIG. 4B depicts a brightfield photomicrograph of the alloy following solution treatment at 900° C. and aging.
Figure 4A:
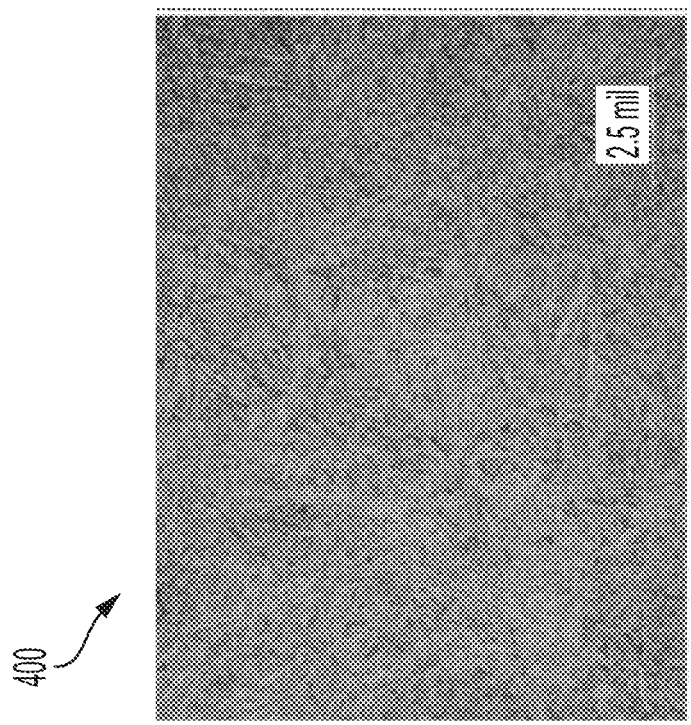
FIG. 4A depicts a brightfield photomicrograph of the alloy, following solution treatment at 900° C.

FIG. 4A depicts a brightfield photomicrograph 400 (at 400× original magnification) of a titanium-zirconium-niobium alloy according to embodiments of the present invention. The photomicrograph 400 (at 400× original magnification) demonstrated the excellent ductility observed in this alloy. FIG. 4B depicts a brightfield photomicrograph 402 of the microstructure of the alloy after solution treatment at 900° C. followed by aging at 200° C. for 3 hours. The structure was remarkably homogeneous and unaffected by the aging treatment. There was no evidence of any embrittling agent, such as omega phase. The yield strength also increased, and there as slight lowering of the elastic modulus after aging. Electron fractographs (not shown) revealed a completely ductile fracture with shear dimpled rupture as the sole fracture mode.

As demonstrated, the alloy not only exhibited high ductility, the ductility was unaffected by aging. This behavior was directly attributed to the congruently melting nature of the alloy and the formation of solid solutions during the subsequent treatments.

Example 5

Figure 5:
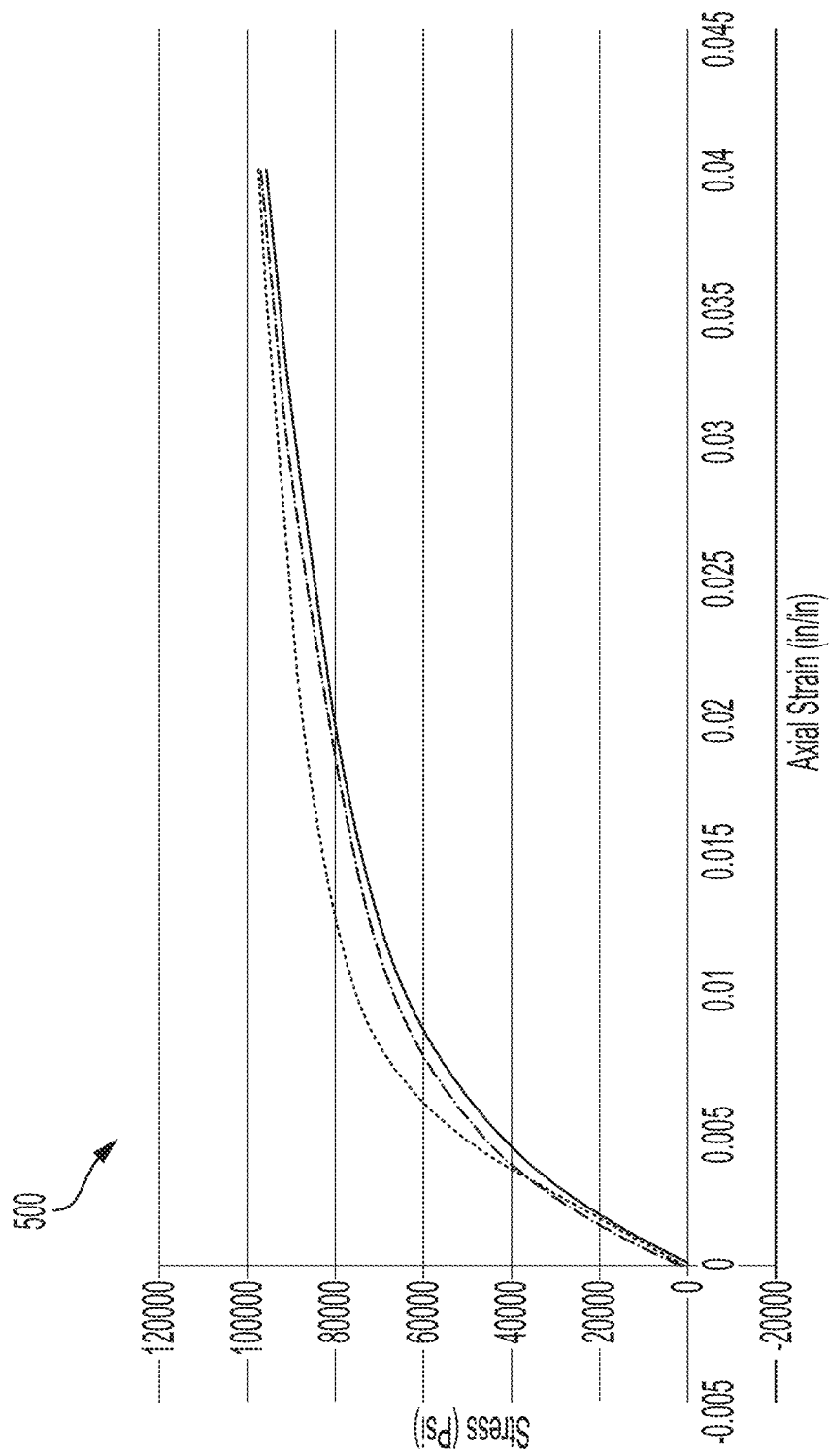
FIG. 5 depicts a stress-strain diagram of the titanium-zirconium-niobium alloy according to embodiments of the present invention.

FIG. 5 depicts a stress-strain diagram 500 of the titanium-zirconium-niobium alloy according to embodiments of the present invention. The stress (psi) is shown as a function of axial strain (inch/inch (in/in)). Due to the tensile load applied, (internal) stress was generated within the material, which cause the material to deform. This deformation was quantified by the strain measurement, which was measured using an extensometer. The curve, generally, was a measure of the material resistance to deformation and included two basic regions. The first region was linear and the deformation was reversible. After the yield point, the deformation became permanent (second region) and irreversible. Generally, this permanent deformation region, accompanied by necking and change of stress state, was the non-linear region. The non-linear region defined small values for n constants.

FIGS. 6A-6D depict graphs 600, 602, 604, 606 illustrating the coefficient of thermal expansion of titanium-zirconium-niobium alloys according to embodiments of the present invention. True axial strain (micro-strain) is shown as a function of temperature (° C.). Two specimens were tested, each bonded with a uni-axial strain gauge along the longitudinal axis. The same type of strain gauge was bonded onto a reference near-zero expansion material (titanium silicate glass). The specimens and the glass piece were put into a thermal cycling chamber and then subjected to two thermal cycles between −65° C. and +128° C. A personal computer based data acquisition system was used to monitor and record strain and temperature from the specimens and glass piece. The coefficient of thermal expansion was determined from the slope of the strain vs. temperature chart. As shown in graphs 600, 602, 604, 606, the coefficient of thermal expansion was consistently low. The low coefficient of thermal expansion, coupled with the low modulus and high ductility, make these materials ideally suited for biomedical, flexure, and other antenna applications.

Example 6

Thermal conductivity of the alloys was measured, as shown in Table 4 below. Thermal conductivity tests were based on ASTM C-177 ("Guarded Hot Plate" method.) Measurements were performed under thermal vacuum, which improved the accuracy of the measurement by eliminating convective parasitic losses from the setup.

Runs 1 and 2 showed temperature dependence trends typical of most metallics, and thermal conductivity decreased with increasing temperature. In contrast, run 3 showed the opposite trend, as thermal conductivity increased significantly when tested at 37.6° C., which is unusual.

TABLE 4

Thermal Conductivity

| Run | Mean Sample Temperature (° C.) | Thermal Resistance (° C./W) | Thermal Conductivity (W/mK) |
|---|---|---|---|
| 1 | −2.3 | 7.72 | 8.75 |
| 2 | 18.1 | 7.78 | 8.65 |
| 3 | 37.6 | 7.09 | 9.49 |

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A compliant mount or mechanism structure comprising: a titanium-zirconium-niobium alloy comprising titanium, 13.5 to 14.5 weight % (wt. %) zirconium, and 18 to 19 wt. % niobium, the titanium-zirconium-niobium alloy having a congruent melting temperature of about 1750 to about 1800° C., and a modulus of elasticity of about 8 to about 11 Megapounds per square inch (Msi) over a temperature range of about −40 to about +125° C.

2. The compliant mount or mechanism structure of claim 1, wherein the titanium-zirconium-niobium alloy further comprises iron, oxygen, carbon, nitrogen, hydrogen, or a combination thereof.

3. The compliant mount or mechanism structure of claim 1, wherein the compliant mount or mechanism structure is a flexure, an optical mount, or an antenna.

4. The compliant mount or mechanism structure of claim 1, wherein the titanium-zirconium-niobium alloy has an elongation at break of about 20% to about 30%.

5. The compliant mount or mechanism structure of claim 1, wherein the titanium-zirconium-niobium alloy does not form an omega phase and is not susceptible to embrittlement.

6. The compliant mount or mechanism structure of claim 1, wherein compliant mount of mechanism structure is part of a biomedical device or aircraft structure.

7. A powder composition comprising:
a titanium-zirconium-niobium alloy comprising titanium, 13.5 to 14.5 wt. % zirconium, and 18 to 19 wt. % niobium, the titanium-zirconium-niobium alloy having a congruent melting temperature of about 1750 to about 1800° C., and a modulus of elasticity of about 8 to about 11 Megapounds per square inch (Msi) over a temperature range of about −40 to about +125° C.

8. The powder composition of claim 7, wherein the powder composition is an additive manufacturing powder.

9. The powder composition of claim 8, wherein the additive manufacturing powder is used a powder used in cold spray, arc melting, electron beam melting, laser melting, or any combination thereof.

10. The powder composition of claim 7, wherein the titanium-zirconium-niobium alloy further comprises iron, oxygen, carbon, nitrogen, hydrogen, or a combination thereof.

11. The powder composition of claim 7, wherein the titanium-zirconium-niobium alloy has an elongation at break of about 20% to about 30%.

12. The powder composition of claim 7, wherein the titanium-zirconium-niobium alloy does not form an omega phase and is not susceptible to embrittlement.

13. A compliant mount or mechanism structure comprising:
a titanium-zirconium-niobium alloy consisting of titanium, iron, oxygen, carbon, nitrogen, hydrogen, 13.5 to 14.5 weight % (wt. %) zirconium, 18 to 19 wt. % niobium, and the titanium-zirconium-niobium alloy having a congruent melting temperature of about 1750 to about 1800° C., and a modulus of elasticity of about 8 to about 11 Megapounds per square inch (Msi) over a temperature range of about −40 to about +125° C.;
wherein each of the iron, the oxygen, the carbon, nitrogen, and hydrogen is less than 0.2 weight %.

* * * * *